United States Patent
Tsai (10) Patent No.: US 7,741,963 B2
(45) Date of Patent: Jun. 22, 2010

(54) WHEEL DATA DETECTION SYSTEM

(76) Inventor: Chin-Ying Tsai, 6F, No. 226, Ta-Hsin Rd., Ta-She Hsiang, Kaohsiung Hsien (TW)

( * ) Notice: Subject to any disclaimer, the term of this patent is extended or adjusted under 35 U.S.C. 154(b) by 143 days.

(21) Appl. No.: 11/535,598

(22) Filed: Sep. 27, 2006

(65) Prior Publication Data

US 2008/0074250 A1   Mar. 27, 2008

(51) Int. Cl.
*B60C 23/02* (2006.01)
(52) U.S. Cl. .................................. 340/442; 340/447
(58) Field of Classification Search ................ 340/442, 340/447, 448, 438; 73/146
See application file for complete search history.

(56) References Cited

U.S. PATENT DOCUMENTS

| | | | |
|---|---|---|---|
| 6,856,245 B2* | 2/2005 | Smith et al. ................ | 340/442 |
| 6,911,903 B2* | 6/2005 | Gladstone et al. ........... | 340/442 |
| 2002/0097148 A1* | 7/2002 | Yamagiwa et al. .......... | 340/442 |
| 2004/0017291 A1* | 1/2004 | Hardman et al. ............ | 340/505 |
| 2004/0140888 A1* | 7/2004 | Simpson .................... | 340/442 |
| 2005/0072348 A1* | 4/2005 | Johns ........................ | 116/34 B |
| 2006/0038669 A1* | 2/2006 | Taguchi ..................... | 340/442 |
| 2007/0069877 A1* | 3/2007 | Fogelstrom ................ | 340/442 |
| 2007/0257785 A1* | 11/2007 | Oboza ....................... | 340/442 |

* cited by examiner

*Primary Examiner*—Toan N Pham
*Assistant Examiner*—Kerri McNally
(74) *Attorney, Agent, or Firm*—Banner & Witcoff, Ltd.

(57) ABSTRACT

A wheel data detection system includes a wireless data detection device and a data receiver. The wireless data detection device includes: a body adapted to be mounted to an inner surface of a rim, and having a closed end, an open end disposed to be in spatial communication with a chamber of a wheel, and a cavity defined between the closed and open ends; a radio frequency unit for receiving and transmitting radio signals; a detector for detecting pressure in the cavity and for generating a pressure signal according to the pressure detected thereby; and a control unit for processing the pressure signal into a data output. The radio frequency unit converts the data output received from the control unit into the radio signal to be transmitted thereby. The data receiver receives the radio signals transmitted by the radio frequency unit.

13 Claims, 6 Drawing Sheets

WHEEL DATA DETECTION SYSTEM

BACKGROUND OF THE INVENTION

1. Field of the Invention

The invention relates to a data detection system, more particularly to a wheel data detection system and a wireless data detection device thereof that are easily applied to wheels of a vehicle.

2. Description of the Related Art

An abnormal tire pressure not only shortens the service life of the tire and increases the fuel consumption of the vehicle, but also degrades the brake performance of the vehicle while increasing the risk of flat tires. When tire pressure increases, the braking distance traveled by the vehicle increases as well. Therefore, in order to ensure driving safety, tire pressure monitoring systems (TPMS) are increasingly being employed in vehicles. In particular, the United States National Highway Traffic Safety Administration (NHTSA) has requested that all vehicles sold in the United States beginning the year 2007 are to be equipped with tire pressure monitoring systems in order to effectively prevent traffic accidents caused by abnormal tire pressure in vehicles.

A tire pressure monitoring system normally includes several detection devices that are mounted respectively on the wheels of a vehicle for detecting tire pressure, and a receiver device for receiving the detected tire pressure from the detection devices and for notifying users of the same. Numerous techniques related to tire pressure monitoring systems are present today.

U.S. Pat. No. 7,009,579 discloses mounting of one or more radio frequency devices directly on the wheels. Each of the radio frequency devices includes a wireless component and an antenna connected to the wireless component for transmitting and receiving radio signals. In this way, the radio frequency devices can be used as detection devices for detecting information such as tire pressure.

Moreover, as radio frequency identification (RFID) technology advances, multiple techniques related to RFID have been introduced. As disclosed in U.S. Pat. No. 6,724,301, an RFID tag loaded with rim identification information can be provided on an outer surface of the rim that faces the tire, and another RFID tag loaded with tire identification information can be provided on an inner surface of the tire. The identification information can include name of manufacturer, product number, date of production/use, etc., in order to allow users or manufacturers to track the source of the rims and tires. Further, the RFID tags can further be facilitated to detect tire pressure. In addition, Taiwanese Patent No. 563,639 also discloses mounting a detection device at the outer surface of the rim.

However, U.S. Pat. No. 7,009,579 discloses mounting of the detection device directly on the surface of the wheel. Thus, if a vehicle is to use the detection device, all of its wheels need to be replaced with new ones that have the detection devices mounted thereto, resulting in a relatively high cost. In addition, when the wheels equipped with the detection devices wear out and need replacement, the detection devices are disposed along with the worn out wheels and cannot be reused. On the other hand, according to U.S. Pat. No. 6,724,301 and Taiwanese Patent No. 563,639, the detection device is mounted on the outer surface of the rim facing the tire. This way, the rim and the tire need to be dissembled before the detection devices can be mounted, resulting in inconvenience during application.

SUMMARY OF THE INVENTION

Therefore, the object of the present invention is to provide a wheel data detection system including a wireless data detection device that can be easily mounted to a wheel and that is convenient to use.

According to the present invention, there is provided a wheel data detection system for a wheel that includes a rim having inner and outer surfaces, and a tire mounted to the outer surface of the rim and cooperating with the rim to define a chamber therebetween. The wheel data detection system includes a wireless data detection device and a data receiver device. The wireless data detection device includes a main body, a radio frequency unit, a detection unit, and a control unit. The main body is adapted to be mounted to the inner surface of the rim, and has a closed end, an open end opposite to the closed end and disposed to be in spatial communication with the chamber of the wheel, and a cavity defined between the closed and open ends. The radio frequency unit is mounted to the main body for receiving and transmitting radio signals. The detection unit is mounted to the main body for detecting pressure in the cavity and for generating a pressure signal according to the pressure detected thereby. The control unit is mounted to the main body, and is connected electrically to the radio frequency unit and the detection unit for processing the pressure signal received from the detection unit into a data output, and for transmitting the data output to the radio frequency unit. The radio frequency unit converts the data output received from the control unit into the radio signal to be transmitted thereby. The data receiver device receives the radio signals transmitted by the radio frequency unit of the wireless data detection device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted herein that like elements are denoted by the same reference numerals throughout the disclosure.

In order to simplify application of a wheel data detection system to a wheel as compared to the prior art, the present invention contemplates that the wheel data detection system be mounted to an inner surface of a rim of the wheel. The wheel data detection system according to the present invention is for application to wheels of a vehicle, which may be of any type that is equipped with pneumatic tires, such as a car, a truck, a bus, a container van, a construction vehicle, or a motorbike.

Figure 1:
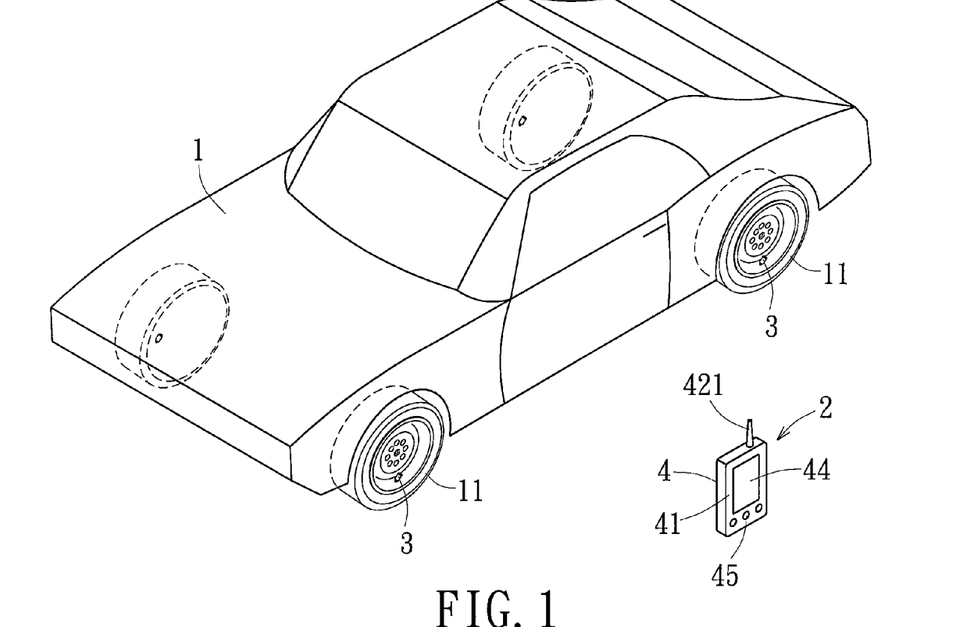
FIG. 1 is a schematic diagram of the first preferred embodiment of a wheel data detection system according to the present invention when applied to a car.
Figure 2:
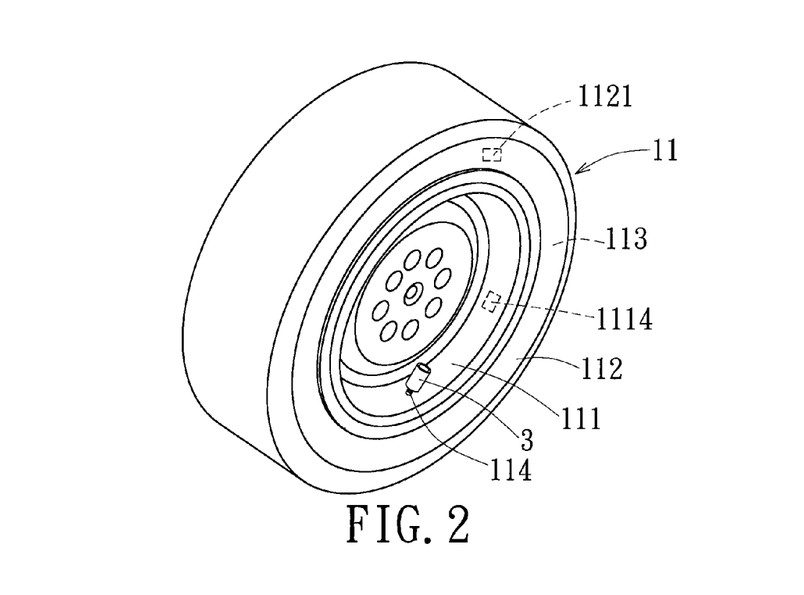
FIG. 2 is a schematic diagram of a wheel having a wireless data detection device according to the first preferred embodiment applied thereto.
Figure 3:
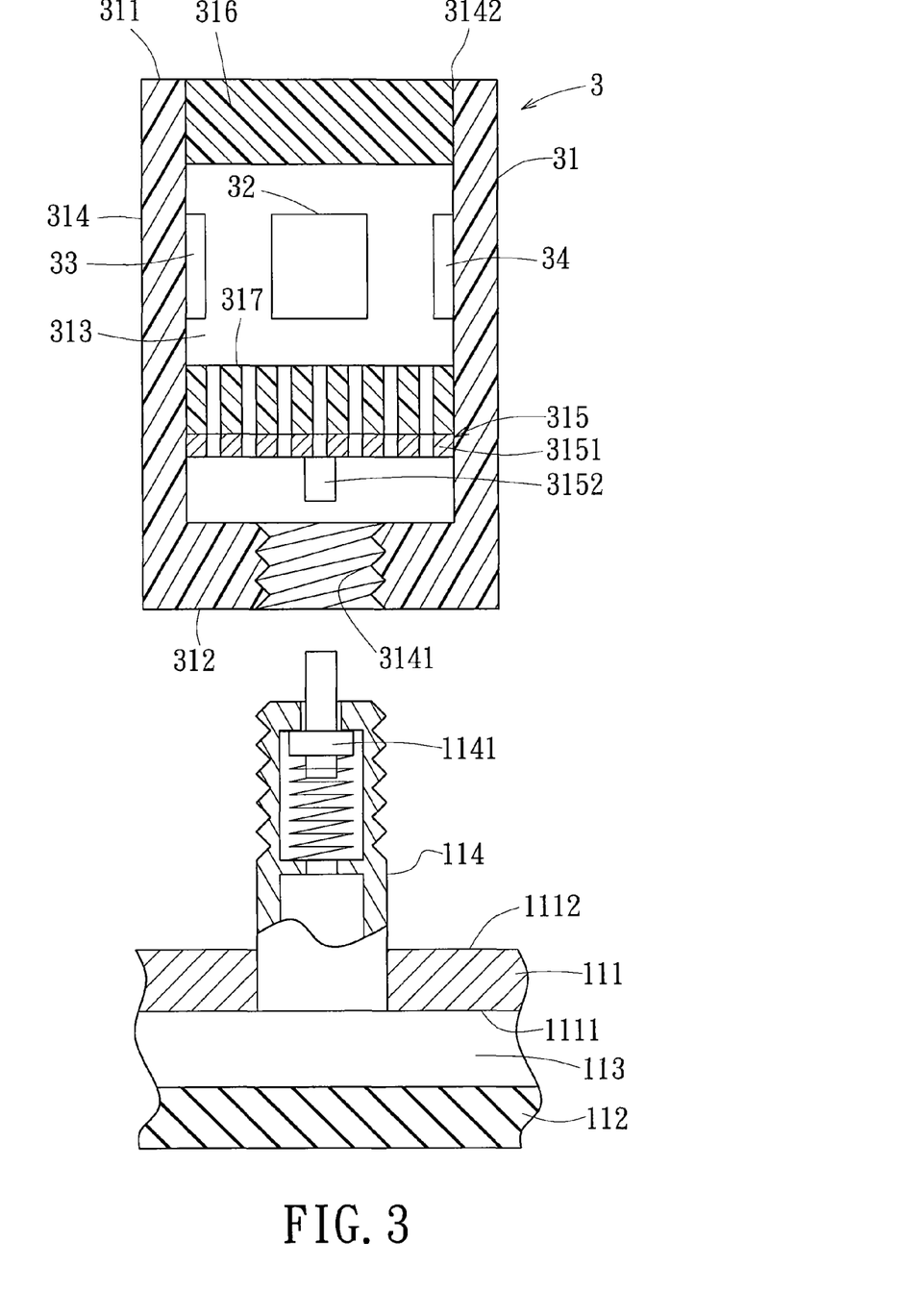
FIG. 3 is a fragmentary sectional view of a wireless data detection device according to the first preferred embodiment.
Figure 4:
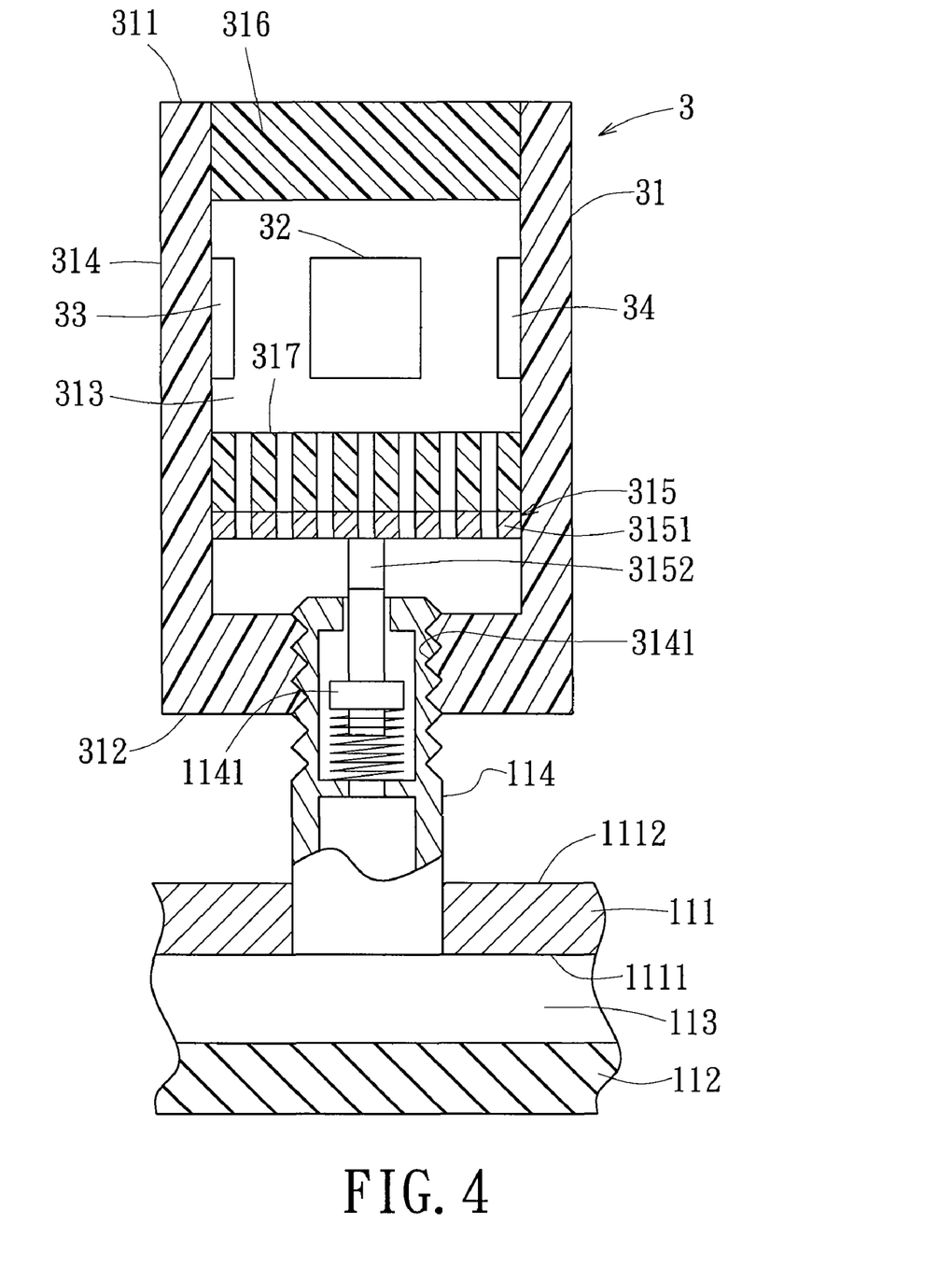
FIG. 4 is a fragmentary sectional view of the wireless data detection device according to the first preferred embodiment when applied to a wheel, illustrating a first open position of a first valve stem.

As shown in FIG. 1, the first preferred embodiment of a wheel data detection system 2 according to the present invention is applied to a car 1. The car 1 is equipped with four wheels 11. As shown in FIG. 2 and FIG. 3, each of the wheels 11 includes a rim 111 having inner and outer surfaces 1112, 1111, and a tire 112 mounted to the outer surface 1111 of the rim 111 and cooperating with the rim 111 to define a chamber 113 therebetween. Each of the wheels 11 further includes a tire valve 114 provided on the inner surface 1112 of the rim 111, disposed in spatial communication with the chamber 113, and including a first valve stem 1141 operable to move between first closed and first open positions, as illustrated in FIG. 3 and FIG. 4, respectively. As shown in FIG. 3, the first valve stem 1141 is disposed at the first closed position such that the chamber 113 is kept from spatial communication with the environment. As shown in FIG. 4, the first valve stem 1141 is disposed at the first open position such that the chamber 113 is in spatial communication with the environment. Thus, the chamber 113 can be refilled with air via the tire valve 114 to inflate the wheel 11 when the first valve stem 1141 is disposed at the first open position.

The wheel data detection system 2 includes at least one wireless data detection device 3 and a data receiver device 4. As shown in FIG. 1, the wheel data detection system 2 according to the first preferred embodiment includes four wireless data detection devices 3, each of which is mounted to a respective wheel 11 of the car 1. As shown in FIG. 2, FIG. 3 and FIG. 4, the wireless data detection device 3 includes a main body 31, a first radio frequency unit 32, a detection unit 33, and a control unit 34.

The main body 31 is adapted to be mounted to the inner surface 1112 of the rim 111, and has a closed end 311, an open end 312 opposite to the closed end 311 and disposed to be in spatial communication with the chamber 113 of the wheel 11, and a cavity 313 defined between the closed and open ends 311, 312. In this embodiment, the main body 31 includes a tubular member 314, a pressing member 315, and a sealing member 316. The tubular member 314 defines the cavity 313, and has first and second openings 3141, 3142. The first opening 3141 serves as the open end 312 of the main body 31, and is adapted to engage the tire valve 114. The pressing member 315 is disposed in the tubular member 314, and is adapted to move the first valve stem 1141 from the first closed position (as shown FIG. 3) to the first open position (as shown FIG. 4) to result in spatial communication between the cavity 313 in the main body 31 and the chamber 113 of the wheel 11 when the tubular member 314 engages the tire valve 114. The sealing member 316 is connected to the tubular member 314 at the second opening 3142 so as to form the closed end 311 of the main body 31. The tubular member 314 and the sealing member 316 are made from a dielectric material. In this embodiment, the tubular member 314 is made from a plastic material, while the sealing member 316 is a rubber plug.

In order to provide enough pressing force to the first valve stem 1141, the pressing member 315 is made from a metal material. The pressing member 315 includes a plate component 3151 received fittingly in the tubular member 314 and formed with a plurality of through holes, and a pressing shaft 3152 extending from the plate component 3151. The pressing shaft 3152 corresponds in size and position to the first valve stem 1141, such that the pressing shaft 3152 abuts against the first valve stem 1141 of the tire valve 114 so as to move the first valve stem 1141 from the first closed position to the first open position when the tubular member 314 engages the tire valve 114. Moreover, the main body 31 further includes a dielectric member 317 disposed in the tubular member 314, and stacked on top of the plate component 3151 of the pressing member 315. In this embodiment, the dielectric member 317 is a rubber plate that is formed with a plurality of vent holes.

Figure 5:
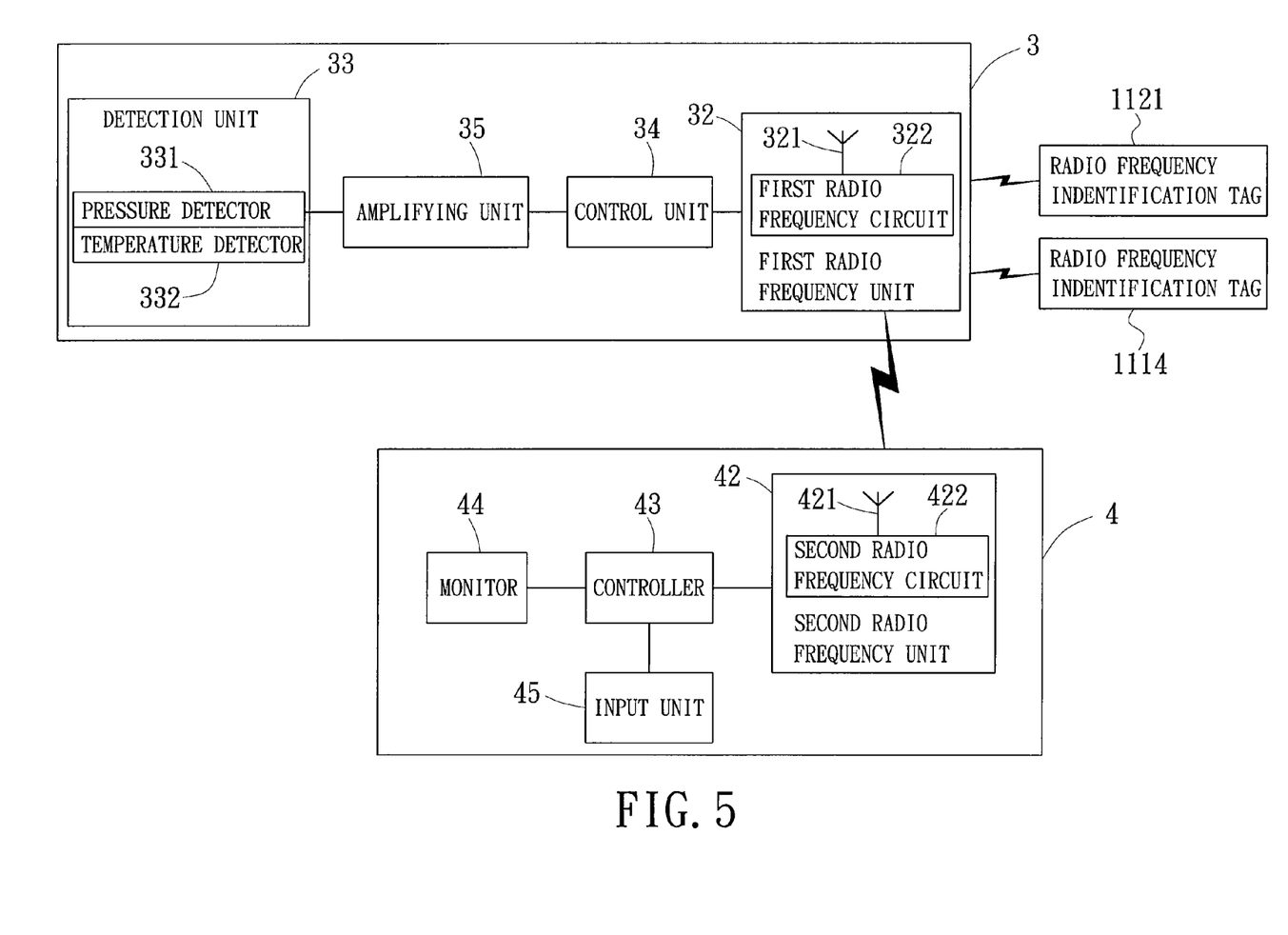
FIG. 5 is a block diagram illustrating electrical components of the wheel data detection system according to the first preferred embodiment.

As shown in FIG. 3 and FIG. 5, the first radio frequency unit 32, the detection unit 33, and the control unit 34 are mounted to the main body 31 and are disposed in the cavity 313.

The first radio frequency unit 32 includes a first antenna 321, and a first radio frequency circuit 322 connected electrically to the first antenna 321 and the control unit 34 for receiving and transmitting radio signals. The first radio frequency unit 32 is enclosed by the tubular member 314, the sealing member 316, and the dielectric member 317, which are all made from dielectric materials in order to ensure proper operation of the first radio frequency unit 32.

The detection unit 33 detects pressure in the cavity 313 and generates a pressure signal according to the pressure detected thereby. Since temperature of the wheel 11 is also an important factor that affects driving safety, the detection unit 33 further detects temperature in the cavity 313, and further generates a temperature signal according to the temperature detected thereby. In particular, the detection unit 33 includes a pressure detector 331 for detecting the pressure in the cavity 313, and a temperature detector 332 for detecting the temperature in the cavity 313. The pressure detector 331 can be a capacitive pressure sensor or a piezoresistive pressure sensor. In this embodiment, the pressure detector 331 is a capacitive pressure detector, the capacitance value of which varies with pressure. The temperature detector 332 can be a positive temperature coefficient resistive temperature detector, the resistance value of which varies with temperature. In this embodiment, the wireless data detection device 3 further includes an amplifying unit 35 connected electrically between the detection unit 33 and the control unit 34 for amplifying the pressure and temperature signals generated by the detection unit 33.

The control unit 34 is connected electrically to the first radio frequency unit 32 and the amplifying unit 35. The control unit 34 receives and processes amplified pressure and temperature signals from the amplifying unit 35 into a data output, and transmits the data output to the first radio frequency unit 32. Since the pressure and temperature signals detected by the detection unit 33, as well as the amplified pressure and temperature signals, are in analog form, the control unit 34 needs to convert the amplified pressure and temperature signals into their corresponding digital form, and then calculate their corresponding pressure and temperature values. In this embodiment, the wireless data detection device 3 is provided with a distinct identification code. The control unit 34 processes the pressure and temperature values and the identification code into the data output.

The first radio frequency unit 32 converts the data output received from the control unit 34 into the radio signal to be transmitted thereby.

The data receiver device 4 receives the radio signals transmitted by the first radio frequency unit 32 of the wireless data detection device 3. The identification code included in the wireless data detection device 3 allows the data receiver device 4 to distinguish the source of the radio signals, i.e., from which one of the wireless data detection devices 3 were the radio signals transmitted.

As shown in FIG. 1 and FIG. 5, the data receiver device 4 is a handheld electronic device that includes a housing 41, a second radio frequency unit 42 for receiving the radio signals transmitted by the first radio frequency unit 32 of the wireless data detection device 3, a monitor 44, and a controller 43 connected electrically between the second radio frequency unit 42 and the monitor 44 for displaying information related to the radio signals received by the second radio frequency unit 42 on the monitor 44. The second radio frequency unit 42, the monitor 44, and the controller 43 are all mounted to the housing 41. When the first radio frequency unit 32 of the wireless data detection device 3 transmits a radio signal, a second antenna 421 of the second radio frequency unit 42 receives the radio signal, and a second radio frequency circuit 422 connected electrically to the second antenna 421 converts the radio signal received by the second antenna 421 into an electrical signal to be received by the controller 43. The controller 43 then displays the information related to the radio signals received by the second radio frequency unit 42 on the monitor 44 for viewing by a user. Moreover, the data receiver device 4 can further include an input unit 45 connected electrically to the controller 43 for the user to enter control commands such that the wireless data detection device 3 detects the pressure and temperature in the cavity 313 and transmits radio signals in response to the control commands provided by the data receiver device 4. However, the wireless data detection device 3 can also actively detect the pressure and temperature in the cavity 313, and transmit the radio signals to the data receiver device 4 without control by the data receiver device 4.

By mounting the wireless data detection devices 3 on the wheels 11 of the car 1, and by monitoring the data receiver device 4, information related to the pressure and temperature of the wheels 11 are available to the user. In addition, the wireless data detection devices 3 can simply be dismounted from the wheels 11 when wheel inflation is required, or when the rim 111 or the tire valve 114 needs to be replaced. Therefore, the wheel data detection system 2 according to the present invention is easy to apply, and can be used repeatedly.

Furthermore, manufacturers frequently trace rims and tires via radio frequency identification (RFID) tags nowadays. Under this circumstance, as shown in FIG. 2, the rim 111 and the tire 112 of the wheel 11 are respectively provided with radio frequency identification tags 1114, 1121, which are loaded with identification information related to the rim 111 and the tire 112, respectively, such as name of manufacturer, product number, and date of production, etc. After the wireless data detection device 3 is mounted to the rim 111, the first radio frequency unit 32 further receives the identification information from the radio frequency identification tags 1114, 1121, and the control unit 34 further controls the first radio frequency unit 32 to send the identification information to the data receiver device 4. As a result, the user can also be notified of the information loaded on the radio frequency identification tags 1114, 1121. On the other hand, the identification information can also act as the distinct identification code of the wireless data detection device 3.

Figure 6:
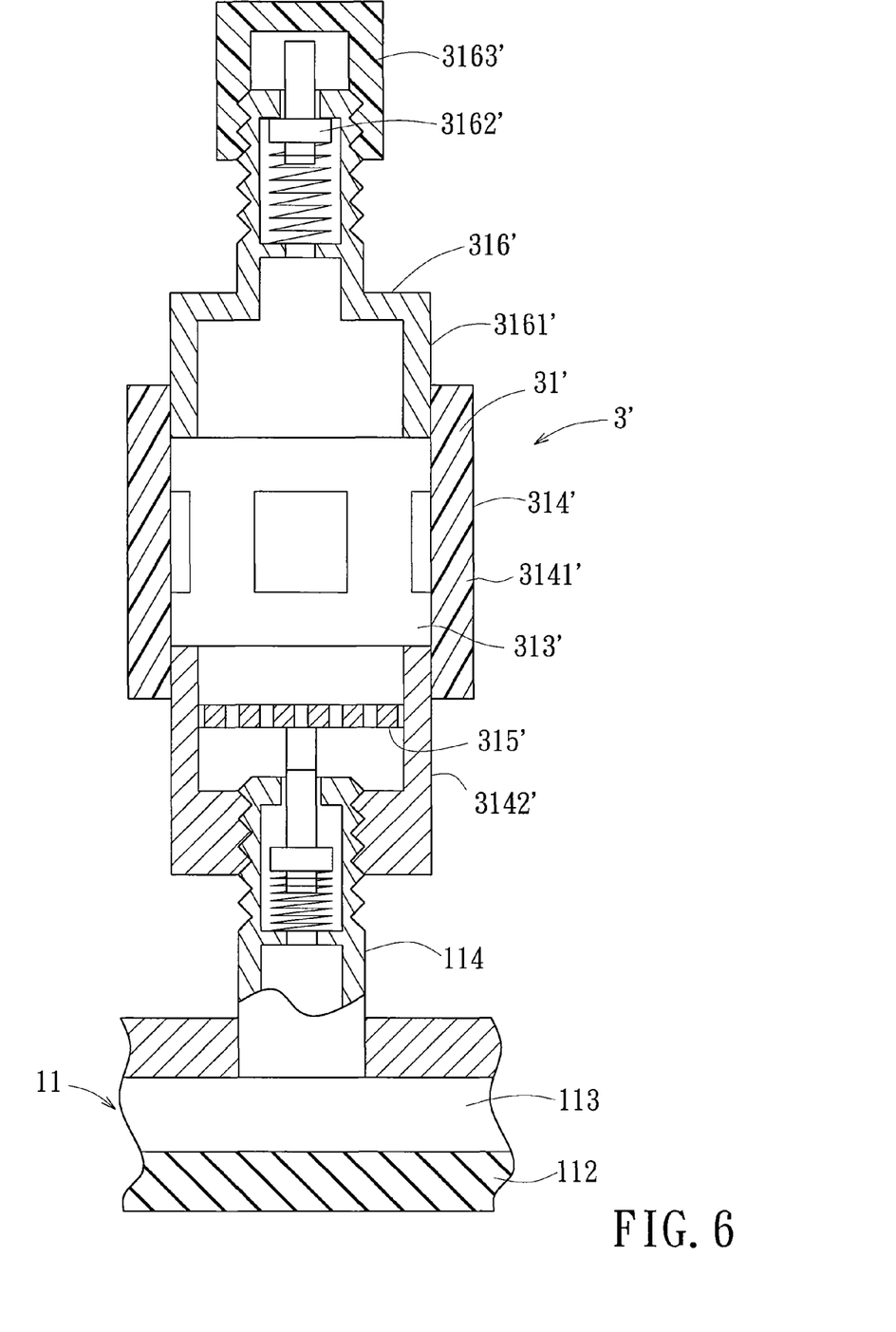
FIG. 6 is a sectional view of a wireless data detection device according to the second preferred embodiment of the present invention when applied to a wheel.

It should be noted herein that the structure and shape of the main body 31 disclosed hereinabove are solely for the purposes of illustration, and those skilled in the art should be aware that the scope of the present invention is not limited by the specific structure and shape disclosed hereinabove. For example, in order to facilitate easy inflation of the wheel 11, the wireless data detection device 3' can be configured differently as shown in FIG. 6 according to the second preferred embodiment of the present invention.

According to the second preferred embodiment, the sealing member 316' includes an air tube 3161' having a first end engaged fittingly to the second opening of the tubular member 314', and disposed in spatial communication with the cavity 313' in the tubular member 314', and a second valve stem 3162' disposed in the air tube 3161', and operable to move between second closed and second open positions. The second valve stem 3162' cooperates with a second end of the air tube 3161' opposite to the first end to form the closed end of the main body 31' when the second valve stem 3162' is disposed at the second closed position, as illustrated in FIG. 6. When the second valve stem 3162' is disposed at the second open position (not shown), the chamber 113, which is in spatial communication with the cavity 313' in the tubular member 314', is disposed in spatial communication with the environment so as to facilitate inflation of the wheel 11 without having to dismount the wireless data detection device 3' from the wheel 11. In order to ensure that the wireless data detection device 3' is airtight, the sealing member 316' further includes a cap 3163' that covers the second end of the air tube 3161'.

Moreover, after taking into consideration the fact that it is relatively difficult to inflate inner wheels of vehicles such as trucks due to blockage by outer wheels thereof, the tubular member 314' of the main body 31' is designed to include upper and lower tubular portions 3141', 3142' coupled fittingly to each other. The lower tubular portion 3142' is adapted to engage the tire valve 114 of the wheel 11. The pressing member 315' is disposed in the lower tubular portion 3142'. This way, a total length of the wireless data detection device 3' is increased in order to facilitate wheel inflation.

Figure 7:
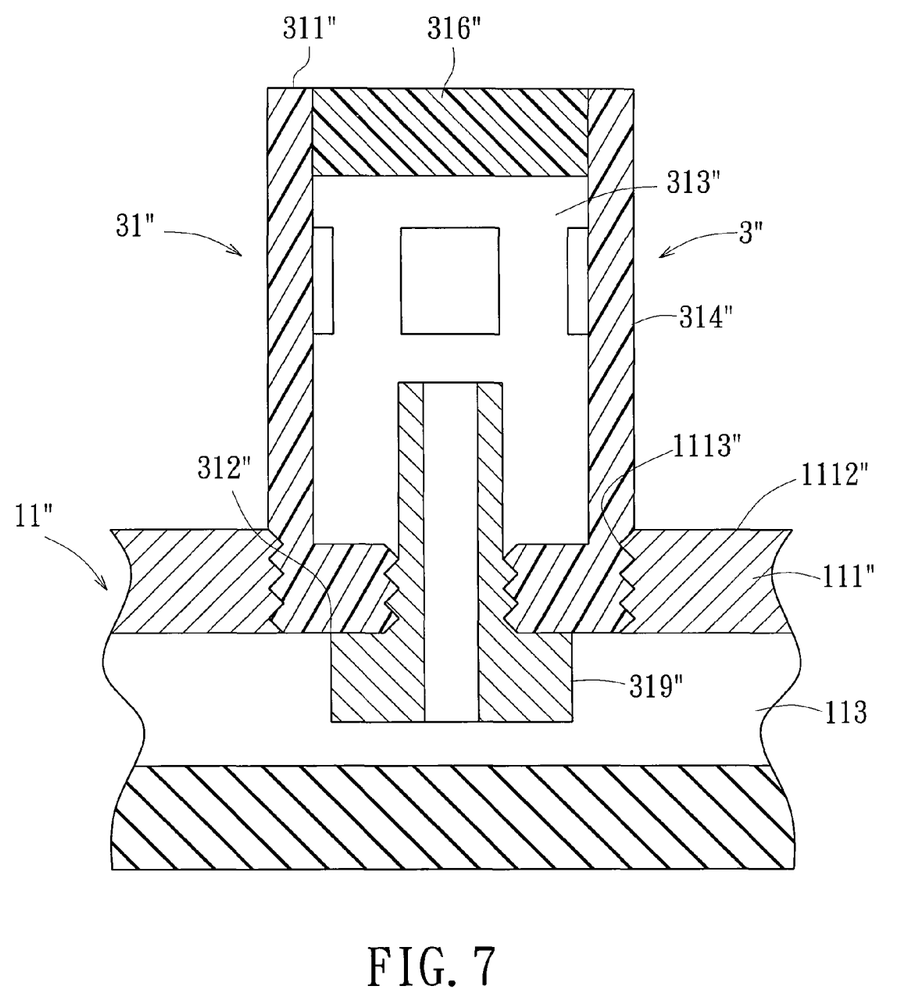
FIG. 7 is a sectional view of a wireless data detection device according to the third preferred embodiment of the present invention when applied to a wheel.

According to the third preferred embodiment of the present invention, mounting of the wireless data detection device 3'' is not limited to the tire valve 114. As shown in FIG. 7, the rim 111'' of the wheel 11'' is formed with a through hole 1113'' at an inner surface 1112'' thereof. The main body 31'' of the wireless data detection device 3'' includes a tubular member 314'' adapted to be secured to the inner surface 1112'' of the rim 111'' at the through hole 1113'', and having first and second openings. As with the first preferred embodiment, the first opening serves as the open end 312'' of the main body 31'', and the main body 31'' further includes a sealing member 316'' connected to the tubular member 314'' at the second opening to form the closed end 311'' of the main body 31''. Since the mounting of the wireless data detection device 3'' does not involve a tire valve, the pressing members 315, 315' of the previous embodiments are omitted herein. The main body 31'' further includes an air tube 319'' disposed in spatial communication with the cavity 313'' and the chamber 113 of the wheel 11''.

In sum, the present invention provides easy application and possible reuse of the wireless data detection device 3, 3', 3'' by mounting the wireless data detection devices 3, 3', 3'' to the inner surface 1112, 1112'' of the rim 111, 111'' of the wheel 11. In addition, not only can users monitor the data receiver device 4 to acquire information related to the pressure and temperature of the wheels 11, the users can also acquire the identification information loaded on the radio frequency identification tags 1114, 1121 via the wireless data detection device 3, 3', 3'' and the data receiver device 4, thereby consolidating different functions into one system. Moreover, the sealing member 316' can be provided with the second valve stem 3162' to facilitate easy inflation of the wheel 11 without having to dismount the wireless data detection device 3' from the wheel 11.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A wheel data detection system for a wheel that includes a rim having inner and outer surfaces and formed with a through hole, a tire mounted to the outer surface of the rim and cooperating with the rim to define a chamber therebetween, and a tire valve provided on the inner surface of the rim, and separate and spaced apart from the through hole, said wheel data detection system comprising:
   a wireless data detection device including:
      a main body adapted to be secured to the inner surface of the rim at the through hole, and having a closed end, an open end opposite to said closed end and disposed to be in spatial communication with the chamber of the wheel, and a cavity defined between said closed and open ends;
      a first radio frequency unit mounted to said main body for receiving and transmitting radio signals;
      a detection unit mounted to said main body for detecting pressure in said cavity and for generating a pressure signal according to the pressure detected thereby; and
      a control unit mounted to said main body, and operably connected to said first radio frequency unit and said detection unit for processing the pressure signal received from said detection unit into a data output, and for transmitting the data output to said first radio frequency unit, said first radio frequency unit converting the data output received from said control unit into the radio signal to be transmitted thereby;
      wherein said main body of said wireless data detection device includes a tubular member adapted to be secured to the inner surface of the rim at the through hole, and having first and second openings, said first opening serving as said open end of said main body, said main body further including a sealing member connected to said tubular member at said second opening to form said closed end of said main body;
      said sealing member being a rubber plug;
      wherein said first radio frequency unit is disposed in said tubular member, and includes an antenna, and a first radio frequency circuit connected electrically to said antenna and said control unit.

2. The wheel data detection system as claimed in claim 1, wherein said tubular member is made from a dielectric material.

3. The wheel data detection system as claimed in claim 1, wherein said wireless data detection device further includes an amplifying unit connected electrically between said detection unit and said control unit for amplifying the pressure signal generated by said detection unit, said control unit receiving amplified pressure signals from said amplifying unit.

4. The wheel data detection system as claimed in claim 1, wherein said wireless data detection device is provided with a distinct identification code, said control unit processing the pressure signal and the identification code into the data output.

5. The wheel data detection system as claimed in claim 1, wherein said detection unit further detects temperature in said cavity, and generates a temperature signal according to the temperature detected thereby, said control unit receiving and processing the pressure and temperature signals into the data output.

6. The wheel data detection system as claimed in claim 1, further comprising a data receiver device for receiving the radio signals transmitted by said first radio frequency unit of said wireless data detection device.

7. The wheel data detection system as claimed in claim 6, wherein said data receiver device includes a second radio frequency unit for receiving the radio signals transmitted by said first radio frequency unit, a monitor, and a controller connected electrically between said second radio frequency unit and said monitor for displaying information related to the radio signals received by said second radio frequency unit on said monitor.

8. The wheel data detection system as claimed in claim 6, one of the rim and the tire including a radio frequency identification tag loaded with identification information, wherein said first radio frequency unit of said wireless data detection device further receives the identification information from the radio frequency identification tag, said control unit further controlling said first radio frequency unit to send the identification information to said data receiver device.

9. The wheel data detection system as claimed in claim 1, wherein said main body is formed with a screw thread for threaded engagement with the rim at the through hole.

10. A rim assembly for a wheel that includes a tire, said rim assembly comprising:
   a rim having an inner surface, and an outer surface that is adapted for mounting of the tire and that cooperates with the tire to define a chamber therebetween, said inner surface being provided with a tire valve in spatial communication with the chamber, said rim being formed with a through hole separate and spaced apart from said tire valve;
   a wheel data detection system including
      wireless data detection device that includes
         a main body secured to said inner surface of said rim at said through hole, and having a closed end, an open end opposite to said closed end and disposed to be in spatial communication with the chamber of the wheel, and a cavity defined between said closed and open ends,
         a first radio frequency unit mounted to said main body for receiving and transmitting radio signals,
         a detection unit mounted to said main body for detecting pressure in said cavity and for generating a pressure signal according to the pressure detected thereby, and
         a control unit mounted to said main body, and operably connected to said first radio frequency unit and said detection unit for processing the pressure signal received from said detection unit into a data output, and for transmitting the data output to said first radio frequency unit, said first radio frequency unit converting the data output received from said control unit into the radio signal to be transmitted thereby;

wherein said main body of said wireless data detection device includes a tubular member adapted to be secured to the inner surface of the rim at the through hole, and having first and second openings, said first opening serving as said open end of said main body, said main body further including a sealing member connected to said tubular member at said second opening to form said closed end of said main body; said sealing member being a rubber plug;

wherein said first radio frequency unit is disposed in said tubular member, and includes an antenna, and a first radio frequency circuit connected electrically to said antenna and said control unit.

11. The rim assembly as according to claim 10, wherein said wireless data detection device further includes an amplifying unit connected electrically between said detection unit and said control unit for amplifying the pressure signal generated by said detection unit, said control unit receiving amplified pressure signals from said amplifying unit.

12. The rim assembly as according to claim 10, wherein said wireless data detection device is provided with a distinct identification code, said control unit processing the pressure signal and the identification code into the data output.

13. The rim assembly as according to claim 10, wherein said detection unit further detects temperature in said cavity, and generates a temperature signal according to the temperature detected thereby, said control unit receiving and processing the pressure and temperature signals into the data output.

* * * * *